(12) United States Patent
Anubolu

(10) Patent No.: US 11,095,552 B1
(45) Date of Patent: Aug. 17, 2021

(54) WEIGHTED COST MULTIPATH PACKET PROCESSING

(71) Applicant: Avago Technologies International Sales Pte. Limited, Singapore (SG)

(72) Inventor: Surendra Anubolu, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 2 days.

(21) Appl. No.: 16/779,372

(22) Filed: Jan. 31, 2020

(51) Int. Cl.
*H04L 12/707* (2013.01)
*H04L 12/727* (2013.01)
*H04L 12/741* (2013.01)

(52) U.S. Cl.
CPC ........... *H04L 45/24* (2013.01); *H04L 45/121* (2013.01); *H04L 45/54* (2013.01)

(58) Field of Classification Search
None
See application file for complete search history.

(56) References Cited

U.S. PATENT DOCUMENTS

| | | | |
|---|---|---|---|
| 7,002,958 B1 * | 2/2006 | Basturk | H04L 45/14 370/392 |
| 9,608,913 B1 | 3/2017 | Kabbani et al. | |
| 10,015,096 B1 | 7/2018 | Singh | |
| 10,320,691 B1 | 6/2019 | Matthews et al. | |
| 2017/0149877 A1 | 5/2017 | Kabbani et al. | |
| 2018/0316599 A1 * | 11/2018 | McDonald | H04L 45/121 |
| 2018/0367431 A1 * | 12/2018 | Lai | H04L 43/0876 |

OTHER PUBLICATIONS

Extended European Search Report from European Application No. 20208524.7, dated May 14, 2021, 9 pages.

* cited by examiner

*Primary Examiner* — Anh Ngoc M Nguyen
(74) *Attorney, Agent, or Firm* — Morgan, Lewis & Bockius LLP

(57) ABSTRACT

The disclosed systems and methods provide weighted cost multipath for packet processing devices. A method includes receiving a network packet for routing through one of a number of paths of a network switch device. The method also includes selecting, via a first function applied to the network packet, a record from a plurality of records corresponding to the number of paths, wherein each of the plurality of records includes a threshold, a first routing index, and a second routing index. The method also includes determining, via a second function applied to the network packet, a routing value within a predefined range of values. The method also includes choosing, from the selected record, the first routing index or the second routing index based on whether the routing value meets the threshold of the selected record. The method also includes routing the network packet based on the chosen routing index.

20 Claims, 9 Drawing Sheets

WEIGHTED COST MULTIPATH PACKET PROCESSING

TECHNICAL FIELD

The present disclosure generally relates to packet processing, and more specifically relates to providing weighted cost multipath in packet processing devices.

BACKGROUND

In packet processing devices such as network switches and routers, load balancing of multiple outgoing links is one function that is necessary for efficient network operation in data centers, high performance computing clusters, and other demanding environments. One approach to load balancing is to provide equal cost multipath, which attempts to provide equal priority to each outgoing link. However, equal cost multipath is not ideal when link speeds differ or when link failures occur in the network.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of this disclosure, the scope of which is set forth in the claims that follow.

DESCRIPTION

Figure 1A:
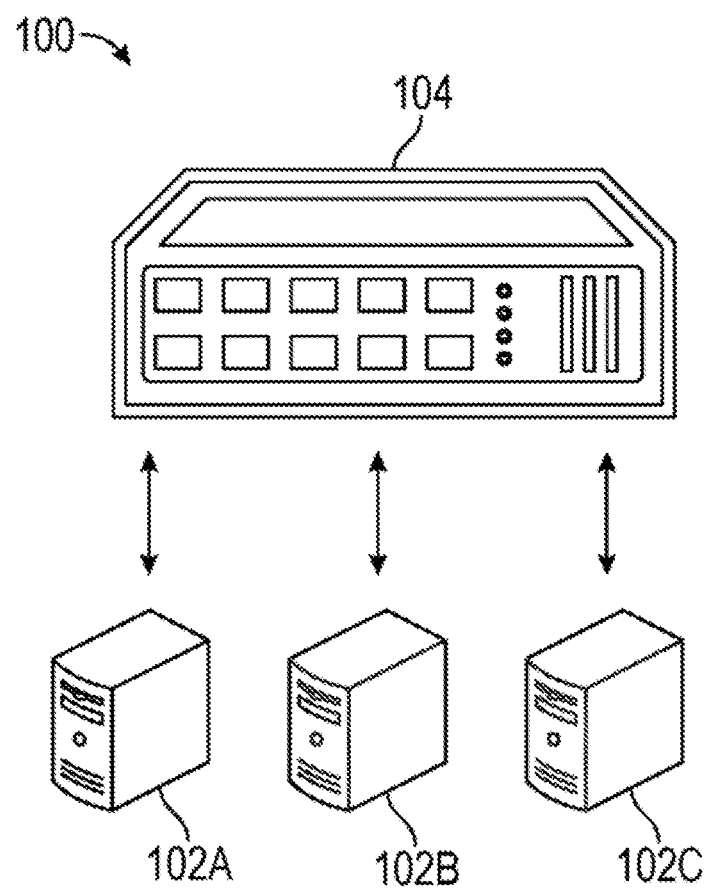
FIG. 1A depicts an example network environment in which weighted cost multipath may be implemented, according to various aspects of the subject technology.

While aspects of the subject technology are described herein with reference to illustrative examples for particular applications, it should be understood that the subject technology is not limited to those particular applications. Those skilled in the art with access to the teachings provided herein will recognize additional modifications, applications, and aspects within the scope thereof and additional fields in which the subject technology would be of significant utility.

According to various implementations, a method for providing weighted cost multipath in packet processing devices is provided. The method may include receiving a network packet for routing through one of a number of paths of a network switch device. The method may also include selecting, via a first function applied to the network packet, a record from a multiple of records corresponding to the number of paths, wherein each of the multiple of records includes a threshold, a first routing index, and a second routing index. The method may also include determining, via a second function applied to the network packet, a routing value within a predefined range of values. The method may also include choosing, from the selected record, the first routing index or the second routing index based on whether the routing value meets the threshold of the selected record. The method may also include routing the network packet through the one of the number of paths of the network switch device based on the chosen routing index.

Other aspects include corresponding systems, apparatuses, and computer program products for implementation of the computer-implemented method.

Further aspects of the subject technology, features, and advantages, as well as the structure and operation of various aspects of the subject technology are described in detail below with reference to accompanying drawings.

According to various implementations, weighted cost multipath packet processing utilizes a two phase hardware accelerated selection process. The first selection phase may use processes similar to weighted cost multipath using replicated members. The second selection phase utilizes a member table to select a path in accordance with defined path weightings, wherein the size of the member table is well defined in proportion to the desired weighting accuracy, the number of available paths, and the number of groups for different routing prefixes. This enables the member table to be quickly updated to reflect changing network conditions while avoiding the latency of free space management that would otherwise be required for replicated members. Further, the memory footprint of the member table is significantly reduced compared to a member table using replicated members, particularly for highly unbalanced weightings that are commonly seen in enterprise networks. Accordingly, searchable memory and other specialized hardware structures can be utilized in a cost efficient manner. Since data sizes used in the member table can be scaled to meet error thresholds for weighting accuracy, the two phase selection process is flexibly adaptable to the needs of various data center applications and network topologies.

FIG. 1A depicts an example network environment 100 in which weighted cost multipath may be implemented, according to various aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C connected via a network switch 104. The electronic devices 102A-C may be connected to the network switch 104, such that the electronic devices 102A-C may be able to communicate with each other via the network switch 104. The electronic devices 102A-C may be connected to the network switch 104 via wire (e.g., Ethernet cable) or wirelessly. The network switch 104, may be, and/or may include all or part of, the network switches discussed below with respect to FIG. 1B and/or the electronic system discussed below with respect to FIG. 5. The electronic devices 102A-C are presented as examples, and in other implementations, other devices may be substituted for one or more of the electronic devices 102A-C.

For example, the electronic devices 102A-C may be computing devices such as laptop computers, desktop computers, servers, peripheral devices (e.g., printers, digital cameras), mobile devices (e.g., mobile phone, tablet), stationary devices (e.g. set-top-boxes), or other appropriate devices capable of communication via a network. In FIG. 1A, by way of example, the electronic devices 102A-C are depicted as network servers. The electronic devices 102A-C may also be network devices, such as other network switches, and the like.

The network switch 104 may implement weighted cost multipath for upstream links. Example network switches 104A-H implementing the subject system are discussed further below with respect to FIG. 1B, and example processes of network switch 104A-H implementing the subject system are discussed further below with respect to FIG. 4.

The network switch 104 may implement weighted cost multipath, which refers to a load balancing technique wherein upstream or outgoing links can be individually weighted to direct network traffic in a proportional manner to each link. To implement weighted cost multipath in hardware for the best performance and low latency, data structures with fast lookup times are desirable. One such hardware based approach uses a member table that replicates members according to their weight, as described further below with respect to FIG. 2A. This allows an outgoing link to be quickly selected by using a fair selection algorithm, such as a hash function, on the member table. However, this approach introduces issues with respect to data structure size and table update time, as the replicated members generate variable sized table groups that become difficult to manage. Further, it becomes difficult to provide sufficient weighting accuracy to support a large number of links with highly uneven weights, which is a common scenario for data center networks using Data Center Interconnect (DCI) and other high bandwidth links.

To address the above described disadvantages, a two-pass selection approach is described. A member table is defined that includes three fields: a threshold, a first routing index, and a second routing index. The member table includes a multiple of records that corresponds to the number of paths or outgoing links. A first fair selection algorithm selects a record from the member table, and a second selection algorithm selects a routing value that is compared to the threshold to select either the first or second routing index. The network packet may then be routed according to the selected routing index. The range of values for the routing value may be within a predetermined range, which may be set according to a desired weighting error threshold. Several example approaches for encoding the link weighting in the member table are also discussed.

By using the two-pass selection approach, group sizes in the member table are well defined and do not increase in proportion to the weights. This allows the member table to be stored in an efficient manner to support a larger quantity of groups and links. Further, table updates, e.g. due to weight changes, may be carried out in constant time as management of variable sized table groups is no longer necessary. Performance is also maintained as the two-pass selection can be implemented using a hardware accelerated design, as shown below with respect to FIG. 3.

Figure 1B:
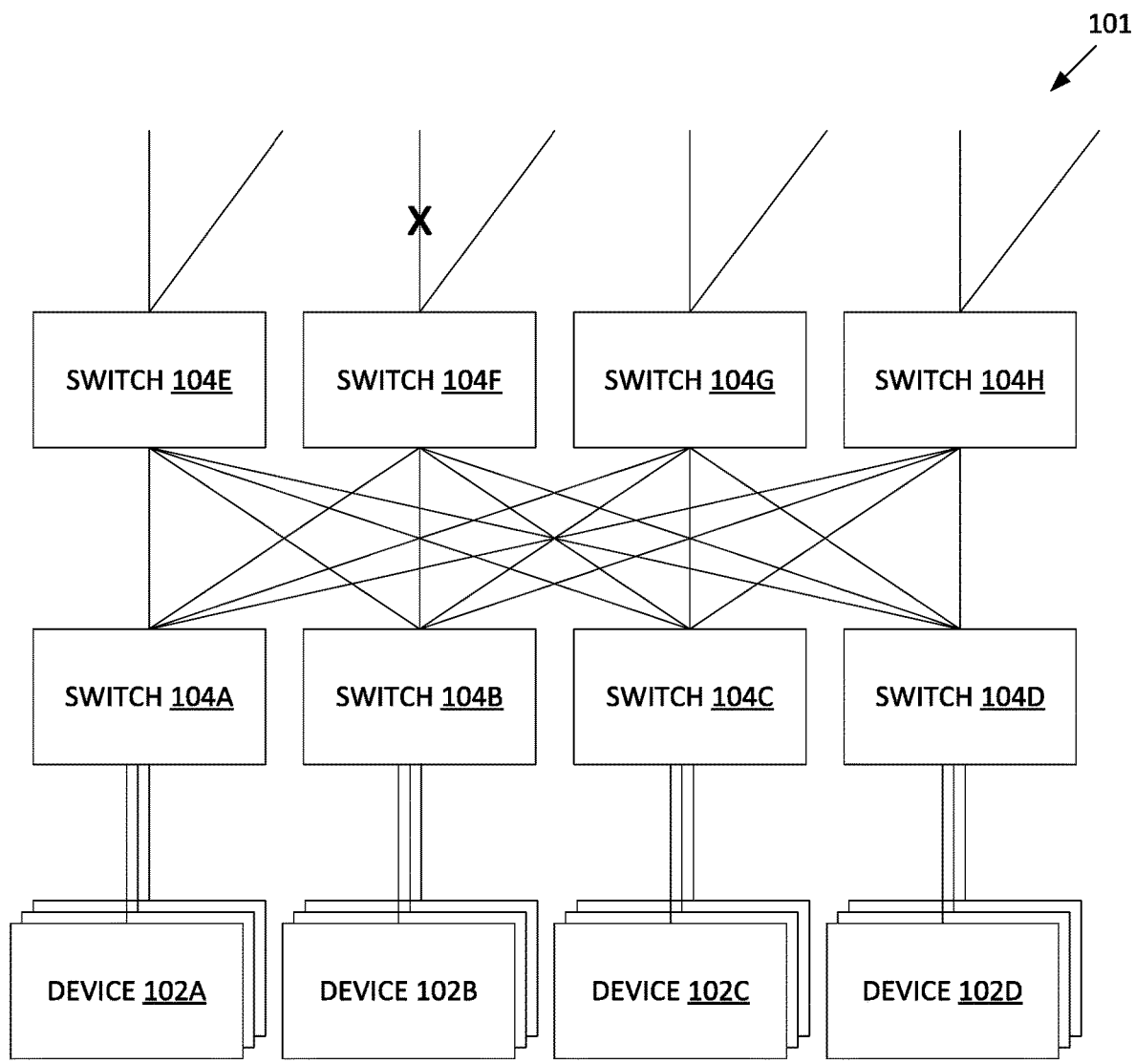
FIG. 1B depicts an example network topology in which weighted cost multipath may be implemented, according to various aspects of the subject technology.

FIG. 1B depicts an example network topology 101 in which weighted cost multipath may be implemented, according to various aspects of the subject technology. As shown in network topology 101, switches 104A, 104B, 104C, and 104D may be connected to several respective devices 102A, 102B, 102C and 102D. Further, each switch 104A-104D may be connected to upstream switches, or switches 104E-104H, in a one-to-many configuration. For example, each switch 104A-104D may route to any of switches 104E, 104F, 104G, and 104H. Several layers of switches may be connected in this fashion within a complete network of a large data center. However, for simplicity, network topology 101 may illustrate only a small portion of such a network. Further, the specific number of switches, devices, and links may vary according to specific use case requirements.

When all network links are operational and transferring data at the same speed, then equal cost multipath may provide satisfactorily performance for load balancing uplinks in network topology 101. However, networks may encounter packet processing bottlenecks, link and device downtime, and varying bandwidth capacities across different uplinks on different switches. In this case, equal cost multipath may no longer provide satisfactory performance for load balancing.

For example, one uplink of switch 104F may become down, as indicated by the X mark in FIG. 1B. To avoid a bottleneck, less network packets should be sent to switch 104F, since the bandwidth processing capacity of switch 104F is reduced compared to switches 104E, 104G, and 104H, which each have two uplinks available. In this example, switches 104E-104H may be assigned respective weights of 2, 1, 2, and 2. The lower weight for switch 104F reflects the higher cost of traversing paths via switch 104F, which only has one uplink available. When switches 104A-104D decide how to route packets to the available upstream paths, or switches 104E-104H, the cost assigned weights may be used to distribute the packets to the multiple paths, thereby implementing weighted cost multipath to avoid a bottleneck at switch 104F.

Figure 2A:
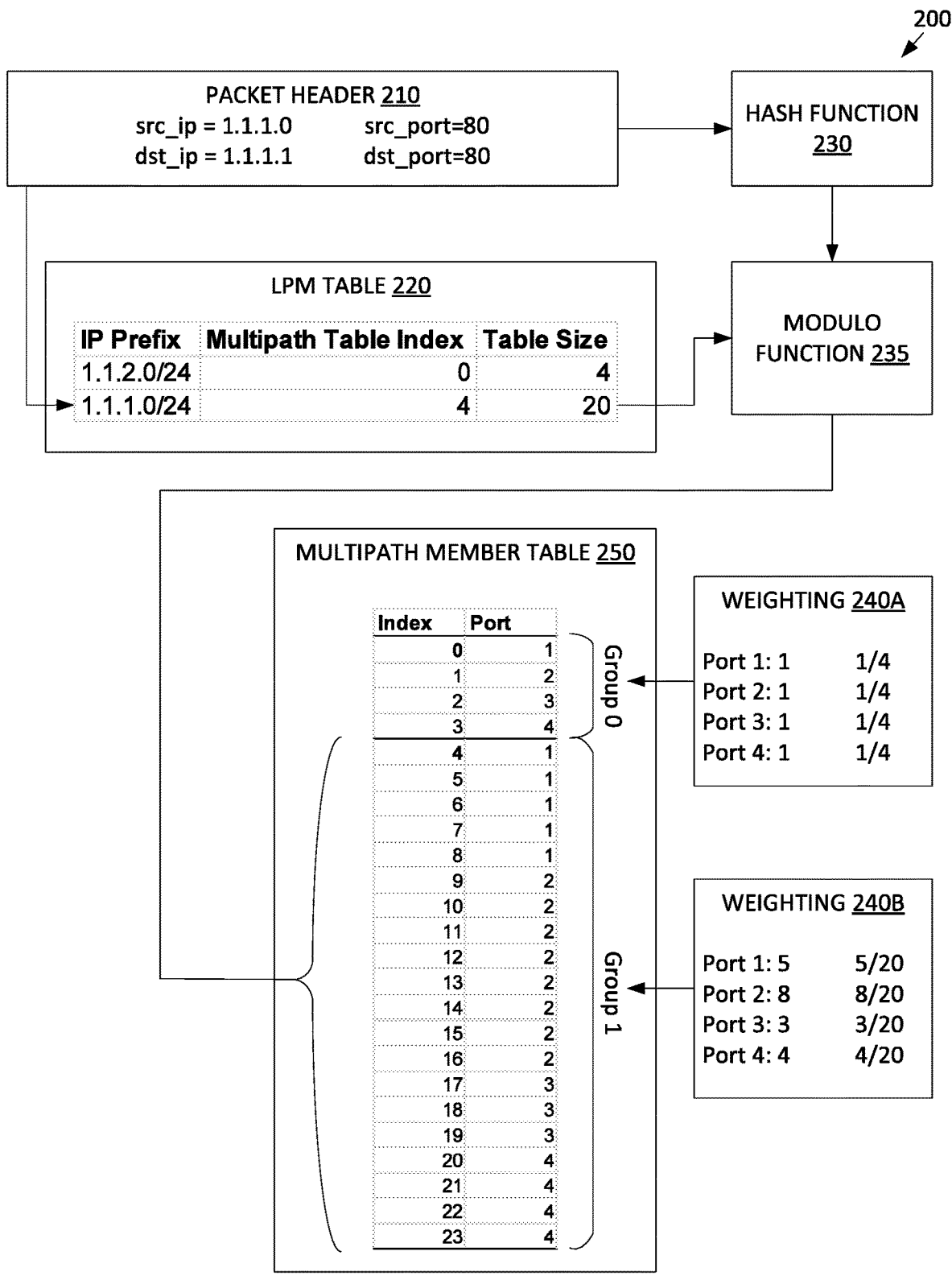
FIG. 2A depicts an example data flow diagram for implementing weighted cost multipath with replicated members, according to various aspects of the subject technology.

FIG. 2A depicts an example data flow 200 for implementing weighted cost multipath with replicated members, according to various aspects of the subject technology. Data flow 200 includes packet header 210, longest prefix match (LPM) table 220, hash function 230, modulo function 235, weighting 240A, weighting 240B, and multipath member table 250.

Referring to FIG. 1B, switch 104A may receive a network packet from device 102A to be routed to a destination. The network packet may include packet header 210, which may include several data fields. For example, the fields may include "src_ip" as "1.1.1.0", which identifies device 102A as the source with an address of 1.1.1.0. While Internet Protocol version 4 (IPv4) addresses are used in this example, Internet Protocol version 6 (IPv6) or other protocols may also be utilized. The fields may also include "dst_ip" as "1.1.1.1", which identifies the destination address. Other fields may be present in packet header 210 that are not specifically shown.

LPM table 220 may be queried using the destination address from packet header 210, or "dst_ip" as "1.1.1.1", to determine the correct group to use in multipath member table 250. For example, "1.1.1.1" may be determined to match "1.1.1.0/24" as the longest prefix match, since the destination "1.1.1.1" is included in the IP prefix "1.1.1.0/24". If the destination is also included in a shorter IP prefix within LPM table 220, such as "1.1.0.0/16" (not shown), then the longest prefix match is selected. Since IP prefix "1.1.1.0/24" is the second entry in LPM table 220, this means that the second group or "Group 1" is to be used in multipath member table 250. As shown in LPM table 220, "Group 1" is identified as beginning at index 4 and having a size of 20 records, or ending at index 23.

The fields in packet header 210 may be combined and input into hash function 230, which generates a number of a fixed size, such as a 16 bit integer. Since hash function 230 may be configured to approximate a uniform distribution, hash function 230 may be used to approximate a fair selection algorithm by further using modulo function 235 to limit the hash values to a desired range. As shown in data flow 200, the table size of the selected Group 1, or 20, may be used as the modulo value to be applied to the output of hash function 230. In some cases, for example when the range is a power of two, modulo function 235 may be implemented using simple bit shifts, masks, or other binary operations. Thus, in some implementations, the table sizes in LPM table 220 may be aligned to power of two boundaries, which may be enforced for sizes exceeding a predetermined minimum size.

Multipath member table 250 includes group 0 and group 1, each corresponding to the first and second entries in LPM table 220. Group 0 for prefix 1.1.2.0/24 may encode weighting 240A. As shown in weighting 240A, each outgoing port 1 through 4 is assigned an equal weight of 1, corresponding to ¼ of the total weight. On the other hand, in weighting 240B, each outgoing port 1 through 4 are assigned different respective weights of 5, 8, 3 and 4, corresponding to 5/20, 8/20, 3/20, and 4/20 of the total weight (5+8+3+4=20). As shown in group 1 within multipath member table 250, these weights are represented by replicating member entries according to their weight. For example, port 2 with a weight of 8 is replicated 8 times from index 9 to index 16.

Accordingly, when hash function 230 generates a 16 bit integer value, which is then narrowed to a range of 0-19 via modulo function 235 and added to the table starting index of 4, any of indexes 4 through 23 may be selected with an approximately fair chance. Since weighting 240B is already encoded in group 1 of multipath member table 250 through the replicated members, this fair chance selection will automatically implement weighted cost multipath.

While data flow 200 described in FIG. 2A can be readily implemented in hardware for high performance, the use of replicated members suffers from several drawbacks. Since the size of the table scales with the weighting, unbalanced weightings with a large number of outgoing ports are difficult to represent in an efficient manner. For example, Data Center Interconnect (DCI) links may require very large weights in proportion to other links, resulting in unbalanced weighting. While replication sizes can be mitigated by limiting scaling to an upper value, this introduces weighting errors that can become unacceptably large for many use cases. Further, updates to the weighting due to changing network conditions may require significant overhead, since the new weighting may generate different sized table groups that need to be managed and reallocated. For example, if group 1 shrinks or grows in size, then other groups after group 1 may require relocation into available free space, triggering high latency write operations. Available free space may also be limited, particularly for high speed memory used for routing structures such as multipath member table 250. To avoid the above drawbacks, an alternative two-pass selection approach is described below.

Figure 2B:
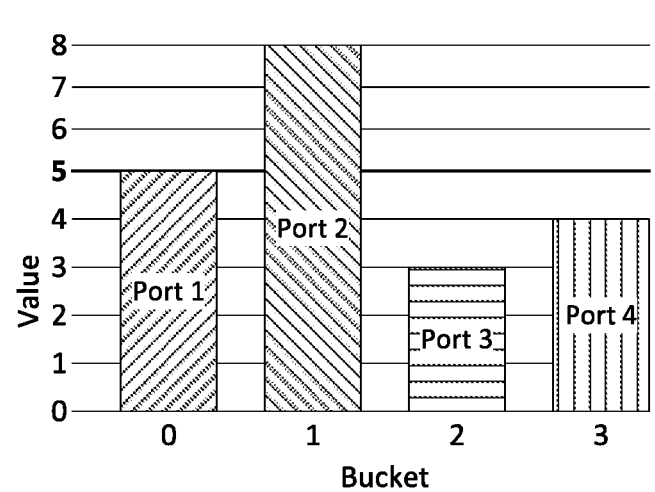
FIG. 2B depicts an example process for generating a mapping to implement weighted cost multipath with two-pass selection, according to various aspects of the subject technology.
Figure 2B:
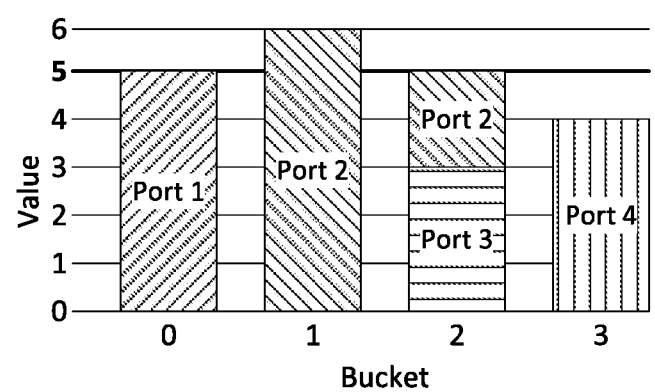
Figure 2B:
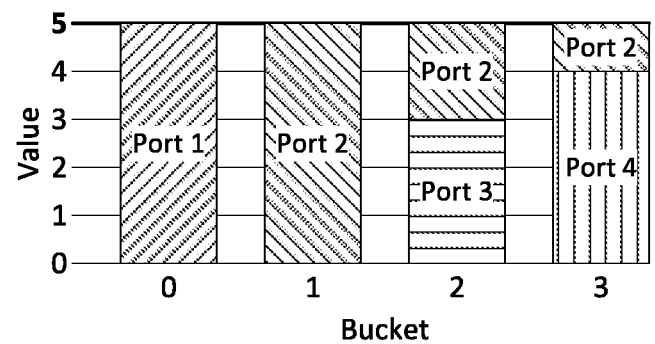
Figure 2B:
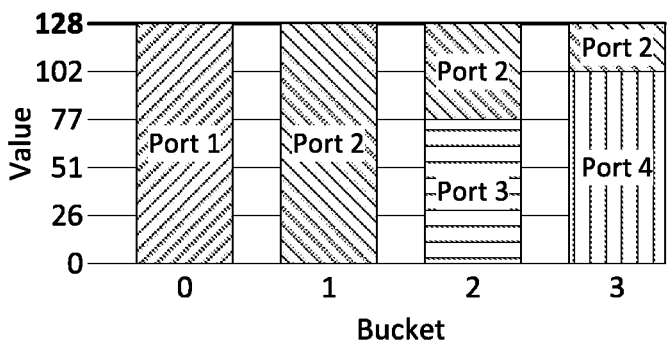

FIG. 2B depicts an example process for generating mapping 242D to implement weighted cost multipath with two-pass selection, according to various aspects of the subject technology. FIG. 2B includes mapping 242A, 242B, 242C and 242D, and graph 270A, 270B, 270C and 270D. Graphs 270A-270D may graphically represent respective mappings 242A-242D.

Referring back to FIG. 2A, multipath member table 250 includes two fields: a table index and a routing index or port number. Since the table index may be implied according to a data offset, an explicit field for the table index may be omitted from the table data structure. Thus, each record may only store a single field. In two-pass selection, this table data structure may be modified such that each record includes at least three fields: a first routing index, a second routing index, and a threshold. In two-pass selection, the first pass may proceed similarly to data flow 200 shown in FIG. 2A. However, an additional second pass is provided, wherein a routing value is determined and compared to the threshold of the selected record. Based on the comparison, either the first or the second routing index is selected for routing the network packet.

Beginning with mapping 242A, a weighting to be mapped such as weighting 240B may be directly copied into the first routing index and the threshold fields, with each first routing index corresponding to the mapped port, each second routing index being a "DC" or "do not care" value, and each threshold corresponding to the weight. Thus, bucket 0 (port 1) has a threshold of 5, bucket 1 (port 2) has a threshold of 8, bucket 2 (port 3) has a threshold of 3, and bucket 3 (port 4) has a threshold of 4.

It is noted that the total weight T=5+8+3+4=20, and thus an equal distribution of weights for N ports corresponds to T/N, or 20/4=5. The goal is to rebalance the weights in each bucket to the equal distribution value of T/N=5. This may be accomplished by sharing a weight of the bucket having the largest weight with a bucket having the smallest weight, and repeating this process for no more than N times until an equal distribution is provided.

One such rebalancing process is shown by graphs 270A-270C and respective mappings 242A-242C. As shown in mapping 242C and graph 270C, the sum of the values for each port corresponds to weighting 240B, and each bucket corresponds to the average or equal distribution value (T/N).

Based on mapping 242C, weighted cost multipath can be provided by performing two fair chance selections: first to select the bucket (from 4 buckets, or 0 through 3), and second to select a routing value within a predetermined range (from 5 values, or 0 through 4), which is based on the equal distribution of the weights (T/N as described above). For example, assume that bucket 2 is selected. In this case, if the routing value is below the threshold of 3 (0, 1, 2), then the selected port corresponds to the first routing index, or port 3. If the routing value meets the threshold of 3 (3, 4), then the selected port corresponds to the second routing index, or port 2.

Since the multipath member table supports multiple groups for different routing prefixes, it is desirable to normalize all possible routing values to a predefined range to simplify hardware implementation and reduce overhead. This predefined range in turn may define the maximum weighting error threshold, e.g. due to rounding errors. For example, to provide a weighting error threshold of less than 1%, the predefined range may be defined to be at least 8 bits, or 256 values.

In the example shown in normalizing mapping 242C to mapping 242D, the values are normalized from a range of 5 values (0-4) to a range of 7 bit values, or a range of 128 values (0-127). Note that if the threshold is stored using the same data size (e.g., 7 bits), then it may not be possible to directly represent "128" in the threshold field, since the maximum possible value is "127". In this case, both the first and second routing indexes may be set to the same value. This equality may be interpreted as setting "128" for the threshold field. While 7 bit values are used in this example, any range of values may be used according to accuracy requirements and available hardware resources. In some implementations, a 12 bit value range may be used.

Figure 2C:
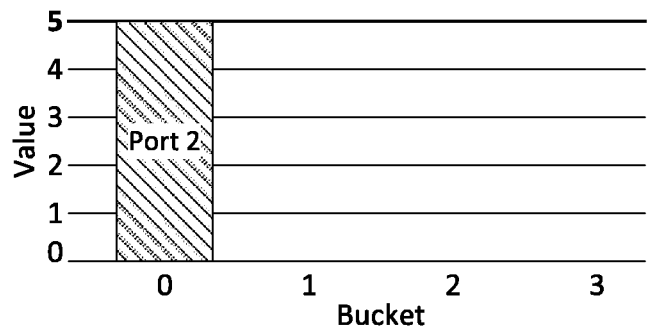
FIG. 2C depicts an alternative example process for generating a mapping to implement weighted cost multipath with two-pass selection, according to various aspects of the subject technology.
Figure 2C:
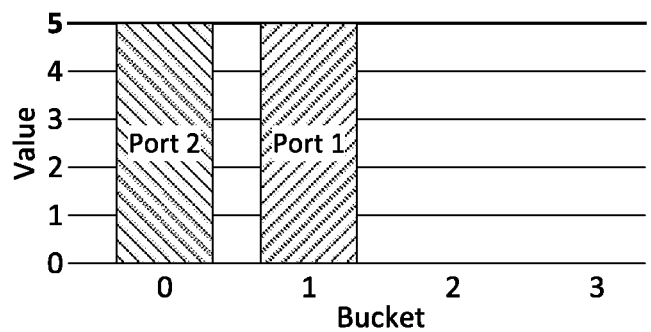
Figure 2C:
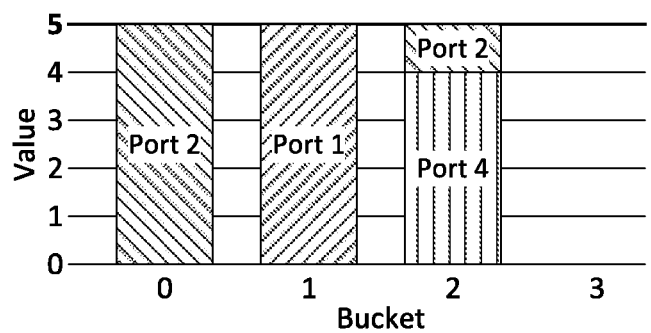
Figure 2C:
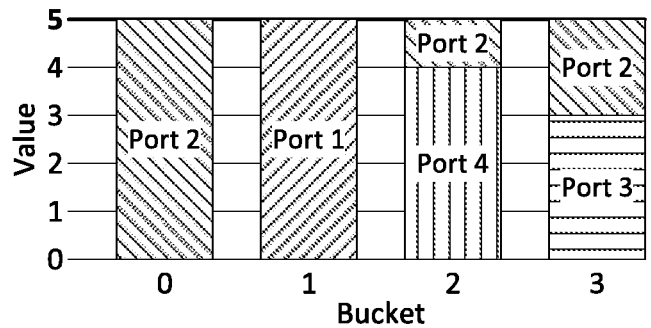

FIG. 2C depicts an alternative example process for generating a mapping 242F to implement weighted cost multipath with two-pass selection, according to various aspects of the subject technology. FIG. 2C includes weighting 244A, 244B, 244C and 244D, mapping 242E and 242F, and graph 272A, 272B, 272C and 272D.

In FIG. 2C, rather than starting with the weighting and rebalancing, each bucket is filled one by one until the mapping is generated. Thus, for each bucket to be filled, the ports with the maximum and minimum weightings may be identified and added to the bucket. If the entire bucket can be filled with solely the maximum weighting, then the entire bucket is filled, as shown in graph 272A and graph 272B. Otherwise, the maximum and minimum weights can be shared, with priority given to the maximum weight, as shown in graph 272C and graph 272D. The resulting mapping is shown in mapping 242E, which can be normalized to 7 bit values to mapping 242F. While the specific ordering of mapping 242D and mapping 242F may not be the same, the proportional end result is the same with either mapping when two-pass selection is used. The example approaches shown in FIG. 2B and FIG. 2C are exemplary; other approaches may also be used to generate the mappings as long as the weightings are correctly encoded.

For example, to verify that the weightings are correctly encoded, the weighting for each path index (e.g. ports 1-4) across the records may be summed from the threshold when the path index matches the first routing index, or summed from a quantity of the predefined range of values for the routing value (e.g. 128) minus the threshold when the path index matches the second routing index. If the summed values match the original weightings, then the weightings are correctly encoded.

Figure 2D:
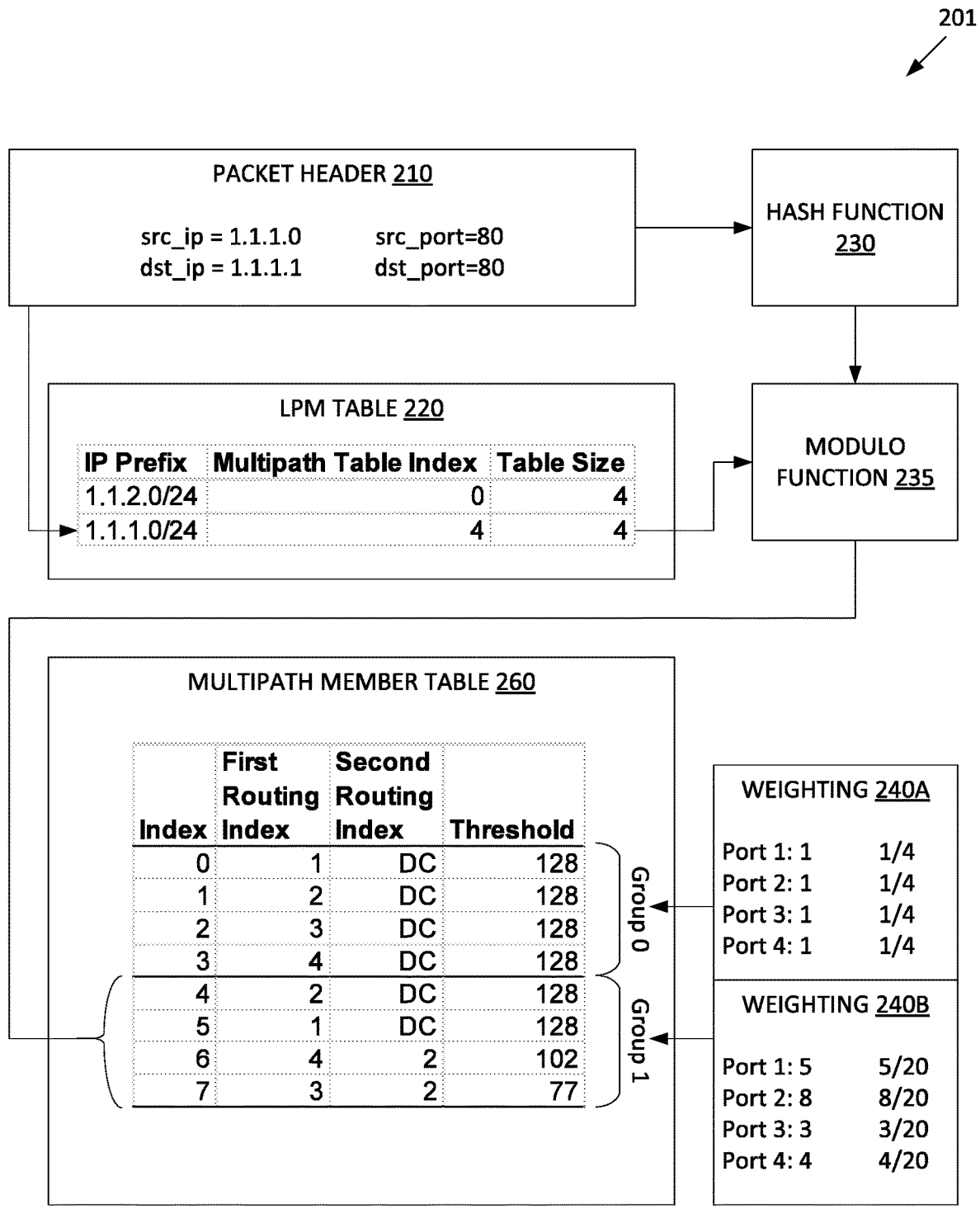
FIG. 2D depicts an example data flow diagram for implementing weighted cost multipath with two-pass selection, according to various aspects of the subject technology.

FIG. 2D depicts an example data flow 201 for implementing weighted cost multipath with two-pass selection, according to various aspects of the subject technology. Data flow 201 includes packet header 210, LPM table 220, hash function 230, modulo function 235, weighting 240A, weighting 240B, and multipath member table 260. As shown in multipath member table 260, group 1 may correspond to mapping 242F from FIG. 2C, which encodes weighting 240B.

Comparing FIG. 2D and FIG. 2A, it can be seen that multipath member table 250 using repetitions is replaced with multipath member table 260 using two-pass selection. Thus, in a first selection step, a bucket is chosen from index 4 through 7 (Group 1). In a second selection step, a routing value is chosen from 0 to 127 (7 bit range), and the routing value is compared to the threshold to determine whether to route via the first routing index or the second routing index.

Since the table size is now directly proportional to the number of paths/ports for routing, the table sizes in LPM table 220 are well defined, rather than changing according to the encoded weightings. Accordingly, even though multipath member table 260 may use more record fields than multipath member table 250, the groups are still much smaller overall due to the number of records for each group being fixed according to the number of paths to support. Weighting updates can also be completed in an expedited manner since the number of records remains constant between updates, avoiding costly free space management. Further, since the second selection step may be completed using known functions similar to hash function 230 and modulo function 235, implementation can be carried out in an efficient hardware accelerated manner, as shown below in FIG. 3.

Figure 3:
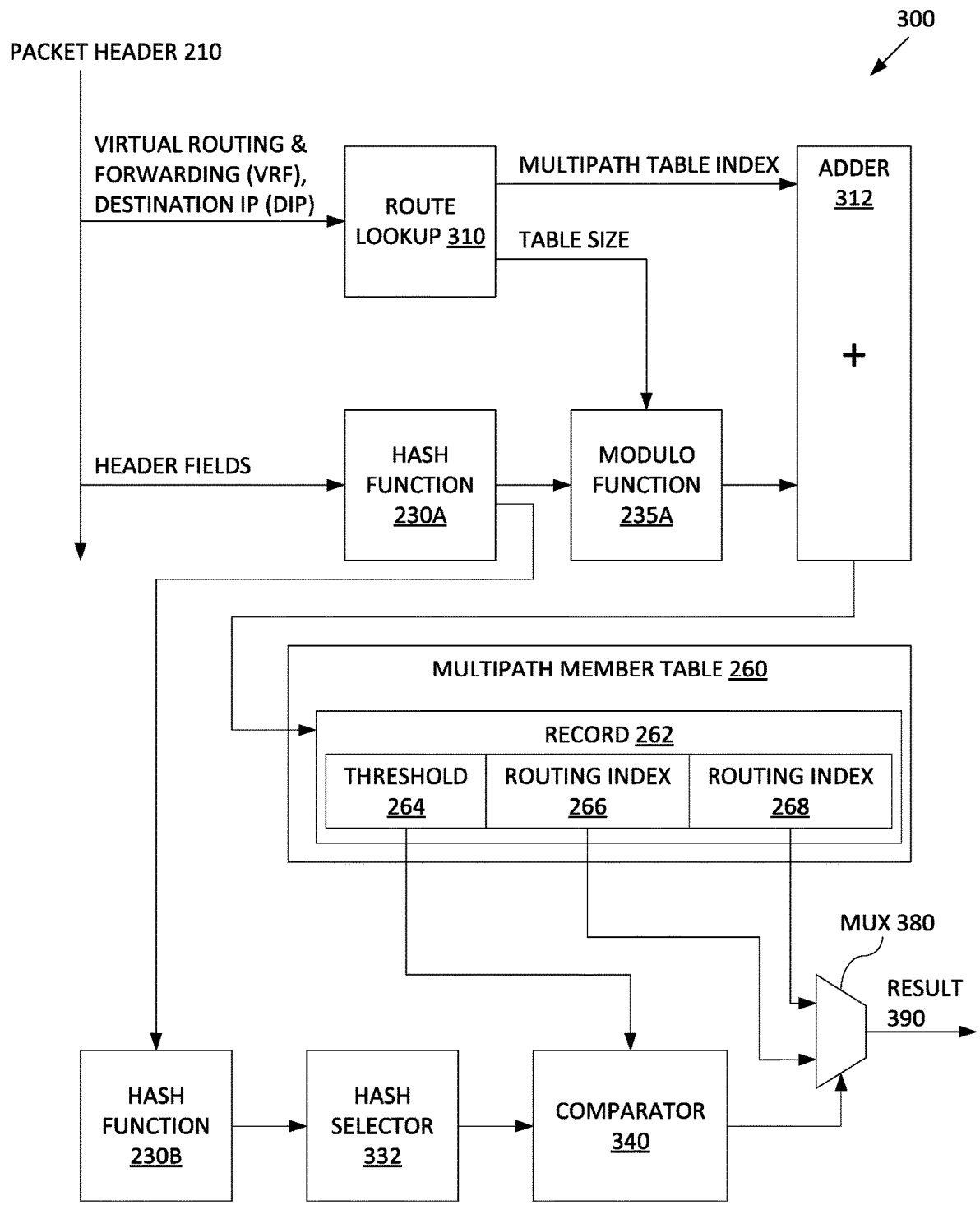
FIG. 3 depicts an example switch for a hardware-based implementation of weighted cost multipath with two-pass selection, according to various aspects of the subject technology.

FIG. 3 depicts an example switch 104A for a hardware-based implementation of weighted cost multipath with two-pass selection, according to various aspects of the subject technology. System 300 includes packet header 210, hash function 230A, hash function 230B, modulo function 235A, modulo function 235B, multipath member table 260, route lookup 310, adder 312, hash selector 332, comparator 340, multiplexer (MUX) 380, and result 390. With respect to FIG. 3, like numbered elements may correspond to the same elements from FIG. 2D.

As shown in FIG. 3, packet header 210 may further include virtual routing and forwarding (VRF) information, which may be used to provide separate routing tables for each customer, e.g. each device 102A-102D shown in FIG. 1A. The VRF information may contain similar routing information as LPM table 220 shown in FIG. 2D. The destination IP (DIP) may correspond to the dst_ip field. With this information, route lookup 310 may perform a prefix IP match to the destination IP to determine the multipath table index and the table size from LPM table 220. For example, assuming that DIP 1.1.1.1 matches to IP prefix 1.1.1.0/24, then the multipath table index is 4 and the table size is 4.

One or more header fields of packet header 210 may also be input to hash function 230A, which may output a value of a fixed size, such as a 16 bit integer. Modulo function 235A may further reduce the value to a specific range according to the table size, or modulo 4 in this example, to provide values between 0-3. This value is added to the multipath table index, or 4, using adder 312. Thus, an index of 4-7 is selected. Based on the index, a corresponding record 262 can be selected from multipath member table 260. The record 262 includes threshold 264, routing index 266 (or the first routing index), and routing index 268 (or the second routing index).

For the second selection pass, the output of hash function 230A may be further input into another hash function 230B, resulting in another value of a fixed size, such as a 16 bit integer. Hash selector 332 may reduce this value to match the possible range of routing values. For example, when the routing values are selected from a range of 7 bit values, then hash selector 332 may select 7 bits from the 16 bits of hash function 230B, for example by bit shifting or bit masks. Comparator 340 then compares the output of hash selector 332 with threshold 264 to determine whether threshold 264 is satisfied or not satisfied. When threshold 264 is not satisfied, then mux 380 may choose routing index 266. When threshold 264 is satisfied, then mux 380 may choose routing index 268. The chosen routing index is then output as result 390, which is then used to select the path or port for routing the network packet associated with packet header 210.

Figure 4:
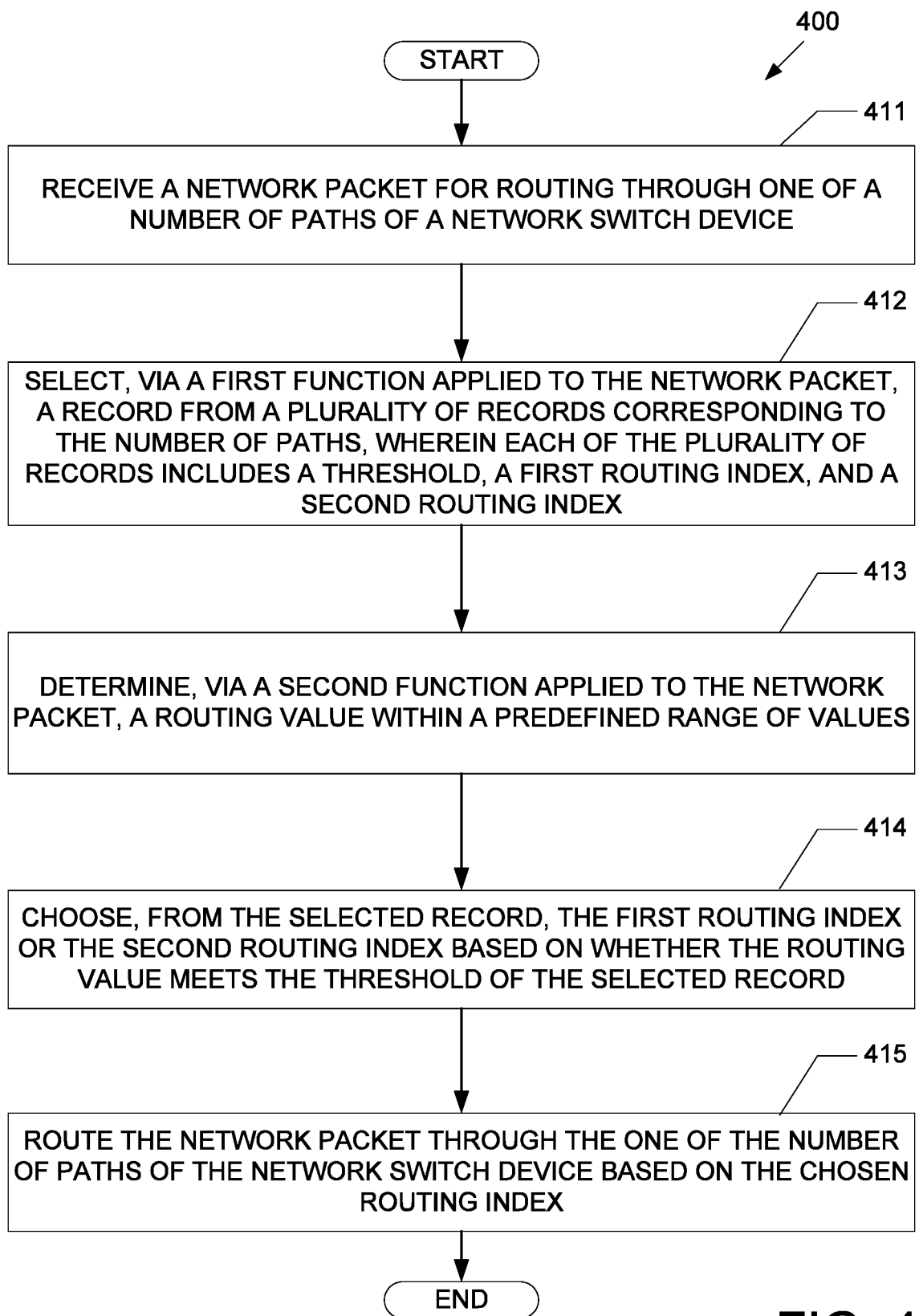
FIG. 4 depicts an example process for providing weighted cost multipath in a packet processing device, according to various aspects of the subject technology.

FIG. 4 depicts an example process 400 for providing weighted cost multipath in a packet processing device, according to various aspects of the subject technology. For explanatory purposes, the various blocks of example process 400 are described herein with reference to FIGS. 1A-3, and the components and/or processes described herein. The one or more of the blocks of process 400 may be implemented, for example, by a computing device, including a processor and other components utilized by the device. In some implementations, one or more of the blocks may be implemented apart from other blocks, and by one or more different processors or devices. Further for explanatory purposes, the blocks of example process 400 are described as occurring in serial, or linearly. However, multiple blocks of example process 400 may occur in parallel. In addition, the blocks of example process 400 need not be performed in the order shown and/or one or more of the blocks of example process 400 need not be performed.

In the depicted example flow diagram, the switch 104A receives a network packet for routing (411). Referring to FIG. 1B, this may correspond to switch 104A receiving a network packet from device 102A for routing through one of four paths, i.e. to switch 104E, switch 104F, switch 104G, or switch 104H. For explanatory purposes, the process 400 is primarily described herein with reference to the network switch 104A of FIG. 1B. However, the process 400 is not limited to the network switch 104A, and one or more blocks (or operations) of the process 400 may be performed by one or more other components of the network switch 104A.

The switch 104A may continue with selecting, via a first function applied to the network packet, a record from a multiple of records corresponding to the number of paths, wherein each of the multiple of records includes a threshold, a first routing index, and a second routing index (412). Referring to FIG. 2D, this may correspond to switch 104A selecting, via hash function 230 and modulo function 235 applied to packet header 210 of the network packet, a record from record indexes 4-7 of multipath member table 260.

The switch 104A may continue with determining, via a second function applied to the network packet, a routing value within a predefined range of values (413). Referring to FIG. 3, this may correspond to determining a routing value via hash function 230B and hash selector 332 applied to packet header 210. As shown in FIG. 3, the input of hash function 230B may be hash function 230A, which may correspond to hash function 230 of FIG. 2D. Hash selector 332 may reduce the range of hash function 230B to the predefined range of values, such as a 7 bit value.

The switch 104A may continue with choosing, from the selected record, the first routing index or the second routing index based on whether the routing value meets the threshold of the selected record (414). Referring to FIG. 3, this may correspond to mux 380 choosing result 390 from routing index 266 or routing index 268 based on whether the routing value from hash selector 332 meets or satisfies threshold 264.

The switch 104A may continue with routing the network packet through the one of the number of network paths of the network switch device based on the chosen routing index (415). Referring to FIG. 1B, this may correspond to switch 104A routing the network packet through one of the network paths to switch 104E-104H based on result 390.

When a network event occurs (e.g. link down, link speed degradation, device down, etc.) that requires a change in the weighting of the upstream links, the network event may cause a message to be propagated that causes routing devices, e.g. switch 104A, to determine a new weighting of the upstream links. The message may be generated directly at the device, e.g. at switch 104A, or propagated from an upstream or downstream device. For example, an upstream device several layers above switch 104A may propagate a link down event to switch 104A that changes the weighting of paths to the upstream device. Based on the new weighting, a new set of records for multipath member table 260 may be generated, e.g. by using the processes described above with respect to FIGS. 2B and 2C. These new records may then replace older records to reflect the new weighting, thereby allowing switch 104A to adapt to changing network conditions.

Many aspects of the above-described example process 400, and related features and applications, may also be implemented as software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
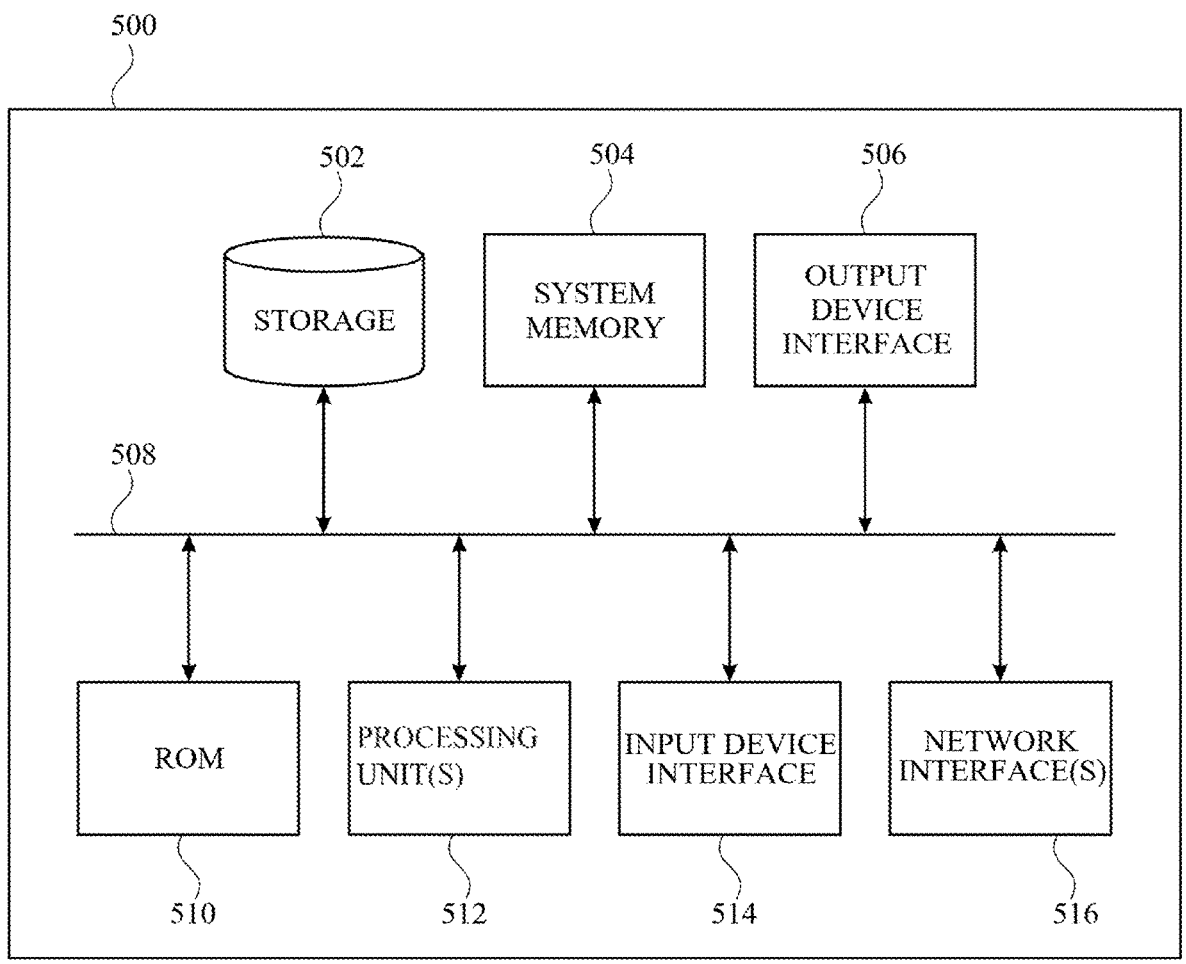
FIG. 5 illustrates an electronic system with which one or more implementations of the subject technology may be implemented.

FIG. 5 illustrates an electronic system 500 with which one or more implementations of the subject technology may be implemented. The electronic system 500 can be, and/or can be a part of, the network switch 104A-H shown in FIG. 1B. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:

receiving a network packet for routing through one of a number of paths of a network switch device;

selecting, via a first function applied to the network packet, a record from a plurality of records corresponding to the number of paths, wherein each of the plurality of records includes a threshold, a first routing index, and a second routing index;

determining, via a second function applied to the network packet, a routing value within a predefined range of values;

choosing, from the selected record, the first routing index or the second routing index based on whether the routing value meets the threshold of the selected record; and routing the network packet through the one of the number of paths of the network switch device based on the chosen routing index.

2. The method of claim 1, wherein prior to the selecting, the method further comprises:

encoding, in the plurality of records, a weighted cost of each of the number of paths of the network switch device such that for each path index from the number of paths, a corresponding weight is determined by:

summing, for each record of the plurality of records, the threshold when the first routing index matches the path index; and summing, for each record of the plurality of records, a quantity of the predefined range of values minus the threshold when the second routing index matches the path index.

3. The method of claim 2, further comprising:
determining a change in the weighted cost of each of the number of paths of the network switch device; and
updating the plurality of records to reflect the change in the weighted cost of each of the number of paths of the network switch device.

4. The method of claim 3, wherein updating the plurality of records does not trigger an update of other records in a routing table containing the plurality of records.

5. The method of claim 1, wherein the first function corresponds to an approximately uniform distribution function.

6. The method of claim 1, wherein the first function includes a hash function performed on at least a portion of a header of the network packet.

7. The method of claim 1, wherein the second function corresponds to an approximately uniform distribution function.

8. The method of claim 1, wherein the first function is input into the second function.

9. The method of claim 1, wherein prior to the determining, the method further comprises:
defining the predefined range of values based on satisfying a weighting error threshold.

10. The method of claim 1, wherein a count of the plurality of records does not exceed the number of paths.

11. The method of claim 1, wherein prior to the selecting, the method further comprises:
selecting the plurality of records from a routing table according to a routing destination of the network packet matching an entry in the routing table.

12. A network switch device comprising:
a plurality of ports corresponding to a number of paths;
a memory storing a plurality of records corresponding to the number of paths, wherein each of the plurality of records includes a threshold, a first routing index, and a second routing index;
one or more processing components configured to:
receive a network packet for routing through one of the number of paths;
select, via a first function applied to the network packet, a record from the plurality of records;
determine, via a second function applied to the network packet, a routing value within a predefined range of values;
choose, from the selected record, the first routing index or the second routing index based on whether the routing value meets the threshold of the selected record; and
route the network packet through the one of the number of paths based on the chosen routing index.

13. The network switch device of claim 12, wherein prior to the selecting, the one or more processing components are further configured to:
encode, in the plurality of records, a weighted cost of each of the number of paths such that for each path index from the number of paths, a corresponding weight is determined by:
summing, for each record of the plurality of records, the threshold when the first routing index matches the path index; and
summing, for each record of the plurality of records, a quantity of the predefined range of values minus the threshold when the second routing index matches the path index.

14. The network switch device of claim 13, wherein the one or more processing components are further configured to:
determine a change in the weighted cost of each of the number of paths; and
update the plurality of records to reflect the change in the weighted cost of each of the number of paths.

15. The network switch device of claim 12, wherein the first function and the second function each correspond to an approximately uniform distribution function.

16. The network switch device of claim 12, wherein the first function includes a hash function performed on at least a portion of a header of the network packet.

17. The network switch device of claim 12, wherein prior to the determining, the one or more processing components are further configured to:
define the predefined range of values based on satisfying a weighting error threshold.

18. The network switch device of claim 12, wherein a count of the plurality of records does not exceed the number of paths.

19. The network switch device of claim 12, wherein prior to the selecting, the one or more processing components are further configured to:
select the plurality of records from a routing table according to a routing destination of the network packet matching an entry in the routing table.

20. A non-transitory storage medium comprising instructions that, when read by one or more processors, cause a method comprising:
receiving a network packet for routing through one of a number of paths of a network switch device;
selecting, via a first function applied to the network packet, a record from a plurality of records corresponding to the number of paths, wherein each of the plurality of records includes a threshold, a first routing index, and a second routing index;
determining, via a second function applied to the network packet, a routing value within a predefined range of values;
choosing, from the selected record, the first routing index or the second routing index based on whether the routing value meets the threshold of the selected record; and
routing the network packet through the one of the number of paths of the network switch device based on the chosen routing index.

\* \* \* \* \*